US012669663B2

(12) United States Patent
Lin et al.

(10) Patent No.: US 12,669,663 B2
(45) Date of Patent: Jun. 30, 2026

(54) ELECTRONIC DEVICE

(71) Applicant: Advanced Semiconductor Engineering, Inc., Kaohsiung (TW)

(72) Inventors: Jr-Wei Lin, Kaohsiung (TW); Mei-Ju Lu, Kaohsiung (TW); Wen Chieh Yang, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 571 days.

(21) Appl. No.: 18/135,080

(22) Filed: Apr. 14, 2023

(65) Prior Publication Data

US 2024/0345343 A1       Oct. 17, 2024

(51) Int. Cl.
*G02B 6/42*          (2006.01)
*G02B 6/43*          (2006.01)

(52) U.S. Cl.
CPC ......... *G02B 6/4274* (2013.01); *G02B 6/4244* (2013.01); *G02B 6/4257* (2013.01); *G02B 6/4295* (2013.01); *G02B 6/43* (2013.01)

(58) Field of Classification Search
None
See application file for complete search history.

(56) References Cited

U.S. PATENT DOCUMENTS

| | | | |
|---|---|---|---|
| 7,923,273 B2 * | 4/2011 | Dutta .................... | G02B 6/428 |
| | | | 438/92 |
| 10,254,476 B1 * | 4/2019 | Dutta .................... | G02B 6/428 |
| 2023/0204819 A1 * | 6/2023 | Ahmed ................ | H01L 25/167 |
| | | | 398/201 |
| 2023/0296854 A1 * | 9/2023 | Winterbottom ........ | G01K 7/028 |
| 2023/0418010 A1 * | 12/2023 | Winterbottom ........ | G01K 7/028 |
| 2024/0069277 A1 * | 2/2024 | Kuo ................... | H01L 25/0652 |
| 2024/0192439 A1 * | 6/2024 | Janta-Polczynski ..... | G02B 6/42 |

* cited by examiner

*Primary Examiner* — Jerry Rahll
(74) *Attorney, Agent, or Firm* — Foley and Lardner LLP

(57)       ABSTRACT

An electronic device includes a first transducer, a second transducer and a bridging component. The second transducer is spaced apart from the first transducer. The bridging component is configured for lateral optical-signal coupling with the first transducer and the second transducer.

16 Claims, 13 Drawing Sheets

ELECTRONIC DEVICE

BACKGROUND

1. Technical Field

The present disclosure relates generally to an electronic device.

2. Description of the Related Art

Silicon photonics and optical engines with integration of at least an electronic IC (EIC) and a photonic IC (PIC) have advantages of high transmission speed and low power loss and thus are applied in various areas. Such integrated device requires transmission of optical signals between PICs.

SUMMARY

In some embodiments, an electronic device includes a first transducer, a second transducer and a bridging component. The second transducer is spaced apart from the first transducer. The bridging component is configured for lateral optical-signal coupling with the first transducer and the second transducer.

In some embodiments, an electronic device includes a first photonic component, a second photonic component and an optical connection element. The second photonic component is spaced apart from the first photonic component. At least a portion of the optical connection element is interposed between the first photonic component and the second photonic component. The first photonic component communicates with the second photonic component through the interposed portion of the optical connection element.

In some embodiments, an electronic device includes a first photonic component, a second photonic component and an optical connection element. The optical connection element has a first lateral surface and a second lateral surface opposite to the first lateral surface. The first lateral surface of the optical connection element faces and is optically coupled with a surface of the first photonic component. The second lateral surface of the optical connection element faces and is optically coupled with a surface of the second photonic component.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
FIG. 1A illustrates a top view of an example of an electronic device according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature on or over a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein the term "active surface" may refer to a surface of an electronic component or passive element on which contact terminals such as contact pads are disposed. The term "active surface" may also refer to a surface of a transducer along which a waveguide is disposed, and the waveguide may be disposed adjacent to the active surface.

Figure 1B:
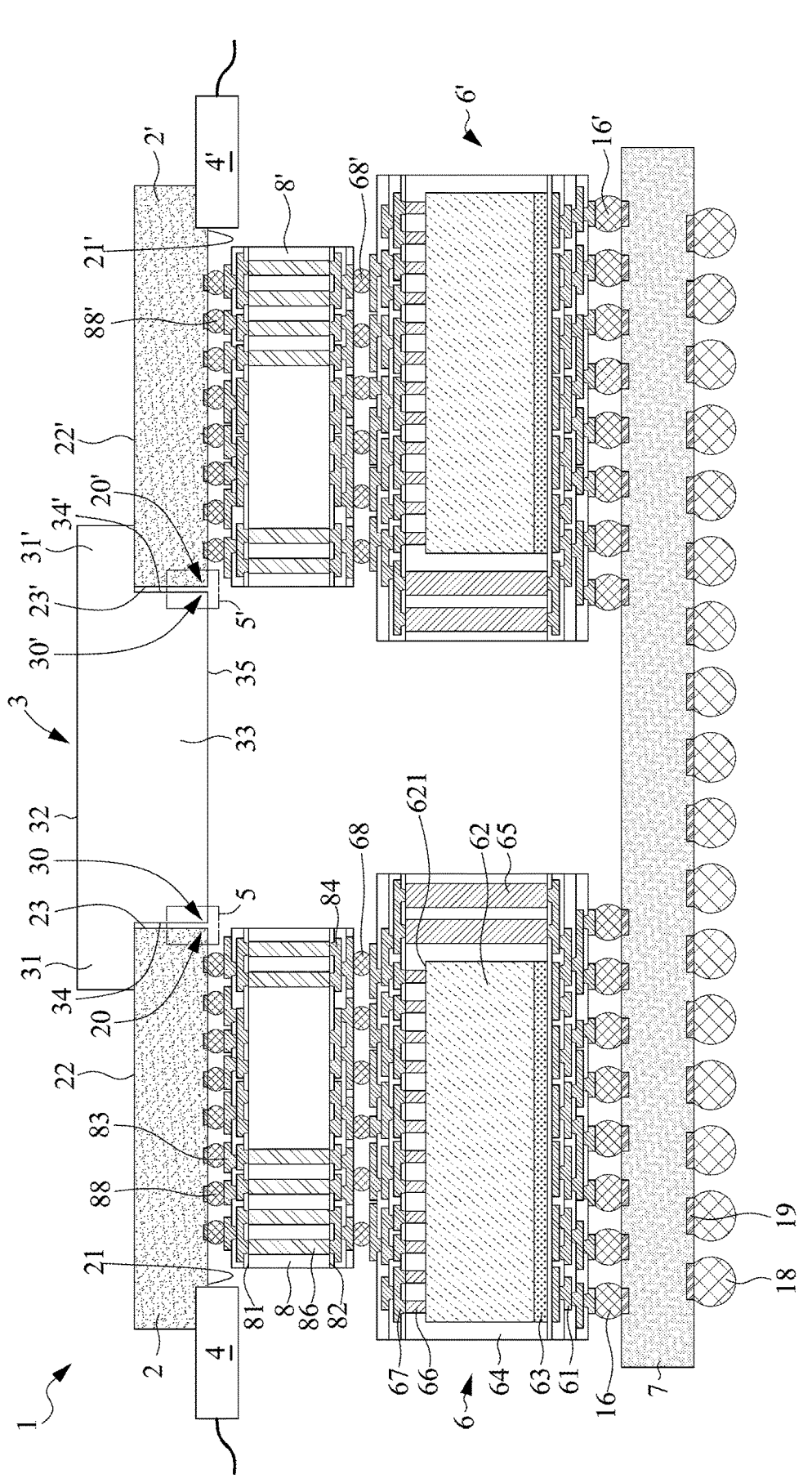
FIG. 1B illustrates a cross-sectional view along line A-A' of the electronic device shown in FIG. 1A.

FIG. 1A illustrates a top view of an example of an electronic device 1 according to some embodiments of the present disclosure. FIG. 1B illustrates a cross-sectional view along line A-A' of the electronic device 1 as shown in FIG. 1A. The electronic device 1 may include a carrier 7, processing units 6 and 6', electronic components 8 and 8', transducers 2 and 2', a bridging component 3, optical components 4 and 4', electrical connection elements 88, 88', 68 and 68', and electrical contacts 16, 16' and 18.

The carrier 7 may include, for example, a printed circuit board, such as a paper-based copper foil laminate, a composite copper foil laminate, or a polymer-impregnated glass-fiber-based copper foil laminate. The carrier 7 may include an interconnection structure, which may include such as a plurality of conductive traces and/or a plurality of conductive vias. The interconnection structure may include a redistribution layer (RDL) and/or a grounding element. In some embodiments, the carrier 7 includes a ceramic material or a metal plate. In some embodiments, the carrier 7 may include a substrate, such as an organic substrate or a leadframe. In some embodiments, the carrier 7 may include a two-layer substrate which includes a core layer and a conductive material and/or structure disposed on an upper surface and a bottom surface of the carrier 7. The conductive material and/or structure may include a plurality of traces. The carrier 7 may include one or more conductive pads 19 in proximity to, adjacent to, or embedded in and exposed at an upper surface and/or a bottom surface of the carrier 7. The carrier 7 may include a solder resist (not shown) on the upper surface and/or the bottom surface of the carrier 7 to fully expose or to expose at least a portion of the conductive pads 19 for electrical connections. The electrical contact(s) 18 may be disposed on the conductive pads 19 for external connection purpose. The electrical contact(s) 18 may be or include a ball grid array (BGA), or a land grid array (LGA). The electrical contact(s) 18 may include one or more conductive materials such as a metal or metal alloy. Examples include gold (Au), silver (Ag), aluminum (Al), copper (Cu), or an alloy thereof. In some embodiments, the carrier 7 supports the processing units 6 and 6'.

The processing unit 6 may be disposed over the carrier 7 and electrically connected to the carrier 7. In some embodiments, the processing unit 6 may be disposed adjacent to the carrier 7. In some embodiments, the processing unit 6 is electrically connected to the carrier through a conductive via 65 (may be referred to as "tall pillar") penetrating through the processing unit 6. In some embodiments, the processing unit 6 may include circuit structures 61 and 67, a processing die 62, an adhesive film 63, a dielectric structure 64, a conductive via 65 and a conductive structure 66. In some embodiments, the processing die 62 has an active surface 621 facing away from the carrier 7 and a back surface opposite to the active surface. The dielectric structure 64 surrounds or encapsulates the processing die 62. The circuit structures 61 and 67 are disposed on two opposite sides of the dielectric structure 64. In some embodiments, the circuit structure 61 is located between the carrier 7 and the processing die 62 and electrically connected to the carrier 7, for example, through the electrical contact(s) 16. In some embodiments, the circuit structures 61 and 67 may be or include a RDL structure which may include a plurality dielectric layers and conductive layers stacked alternatively. The adhesive film 63 may be disclosed on the back surface of the processing die 62 and has a surface coplanar to a surface of the dielectric structure 64. The processing die 62 may be an ASIC, an FPGA, a GPU, or the like, or a combination thereof. The conductive via 65 may be disposed adjacent to or surround the processing die 62. The conductive via 65 penetrates through the dielectric structure 64 and electrically connects the circuit structures 61 and 67. The conductive structure 66 may be disposed on the active surface of the processing die 62, exposed from the dielectric structure 64 and electrically connect the processing die 62 to the circuit structure 67.

In some embodiments, the processing unit 6' may have the same or similar components and/or arrangements as the processing unit 6. The processing unit 6' may also be disposed over the carrier 7 and electrically connected to the carrier 7. In some embodiments, the processing unit 6' may be disposed adjacent to the carrier 7. The processing units 6 and 6' may electrically communicate with each other through the carrier 7.

The electrical contact(s) 16 may electrically connect the processing unit 6 to the carrier 7. The electrical contact(s) 16' may electrically connect the processing unit 6' to the carrier 7. The electrical contacts 16 and 16' may be or include C4 bumps, a BGA, or an LGA. The electrical contacts 16 and 16' may include one or more conductive materials such as a metal or metal alloy. Examples include Au, Ag, Al, Cu, or an alloy thereof.

The electronic component 8 may be disposed at least partially over and electrically connected to the processing unit 6. The electronic component 8 includes a conductive via 86 (may be referred to as "tall pillar") penetrating through the electronic component 8. In some embodiments, the electronic component 8 has a surface 81 and a surface 82 opposite to the surface 81. The surface 81 of the electronic component 8 may be an active surface. The surface 82 faces the processing unit 6. The surface 81 (the active surface) faces away from the processing unit 6. In some embodiments, the electronic component 8 may include circuit structures 83 and 84 disposed on the surfaces 81 and 82, respectively. The conductive via 86 electrically connects the circuit structures 83 and 84. The conductive via 86 may be configured to transmit electric signals between the surface 81 and the surface 82. In some embodiments, the electronic component 8 may be electrically connected to the processing unit 6 through the conductive via 86. Specifically, the electric signals transmitted between electronic component 8 and the processing unit 6 may pass through the circuit structure 83, the conductive via 86, the circuit structure 84 and the electrical connection element(s) 68. The electronic component 8' may be disposed at least partially over and electrically connected to the processing unit 6'. The electronic component 8' may have the same components and arrangements as the electronic component 8. In some embodiments, the electronic components 8 and 8' may independently include an integrated digital signal processor (DSP), a transimpedance amplifier (TIA), a driver (DRV), or a combination thereof. The electrical connection element(s) 68 may electrically connect the electronic component 8 to the processing unit 6. The electrical connection element(s) 68' may electrically connect the electronic component 8' to the processing unit 6'. The electrical connection elements 68 and 68' may be or include conductive bumps, solder balls, or the like. The electrical connection elements 68 and 68' may include one or more conductive materials such as a metal or metal alloy. Examples include Au, Ag, Al, Cu, or an alloy thereof.

The transducers 2 and 2' may be configured to process, receive, and/or transmit optical signal(s), such as converting optical signal(s) to electric signal(s), or converting electric signal(s) to optical signal(s). For example, the transducer 2 is configured to convert electric signals (e.g., received from the electronic component 8) to optical signals (e.g., for transmission to the bridging component 3 and/or the optical component 4), or convert optical signals (e.g., received from the bridging component 3 and/or the optical component 4) to electric signals (e.g., for transmission to the electronic component 8). In some embodiments, the transducer 2 is configured to convert optical signals received from the bridging component 3 to electric signals (e.g., for transmission to the electronic component 8), or convert electric signals (e.g., received from the electronic component 8) to optical signals for transmission to the bridging component 3.

In some embodiments, the transducers 2 and 2' may be photonic components. In some embodiments, the transducer 2 may be or include a photonic IC (PIC).

The transducer 2 may be disposed at least partially over and electrically connected to the electronic component 8. The transducer 2 may be disposed on or over the electronic component 8. The electronic component 8 is disposed under the transducer 2. The electronic component 8 is located between the processing unit 6 and the transducer 2. The electrical component 8 is more adjacent (or closer) to the processing unit 6 than the transducer 2 is. The transducer 2 may have a surface 21, a surface 22 opposite to the surface 21, and a surface 23 extending between the surfaces 21 and 22. The surface 21 of the transducer 2 may be an active surface. The surface 21 of the transducer 2 may face the electronic component 8 and may be electrically connected to the electronic component 8. The surface 23 of the transducer 2 may be a lateral surface.

The transducer 2 includes an optical region 20, which may be an optical-signal transmitting and receiving region. The optical region 20 may be configured for transmitting and receiving optical signals, and/or for optical-signal coupling with the bridging component 3. For example, the optical region 20 may include an exposed portion of a waveguide or a grating component. In some embodiments, the optical region 20 may be disposed or located on the surface 23 of the transducer 2. In some other embodiments, the optical region 20 may be disposed or located on the surface 21 of the transducer 2.

The transducer 2' is separated or spaced apart from the transducer 2. The transducer 2' may be disposed at least partially over and electrically connected to the electronic component 8'. In some embodiments, the transducer 2' may have the same or similar components and/or arrangements as the transducer 2. The transducer 2' may have a surface 21', a surface 22' opposite to the surface 21', and a surface 23' extending between the surfaces 21' and 22'. The surface 21' may be an active surface. The surface 23' may be a lateral surface. The surface 23' of the transducer 2' may face the surface 23 of the transducer 2.

The transducer 2' includes an optical region 20', which may be an optical-signal transmitting and receiving region. The optical region 20' may be configured for transmitting and receiving optical signals, and/or for optical-signal coupling with the bridging component 3. For example, the optical region 20' may include an exposed portion of a waveguide or a grating component. In some embodiments, the optical region 20' may be disposed or located on the surface 23' of the transducer 2'. In some other embodiments, the optical region 20' may be disposed or located on the surface 21' of the transducer 2'.

The electrical connection element(s) 88 may electrically connect the transducer 2 to the electronic component 8. The electrical connection element(s) 88' may electrically connect the transducer 2' to the electronic component 8'. The electrical connection elements 88 and 88' may be or include conductive bumps, solder balls, or the like. The electrical connection elements 88 and 88' may include one or more conductive materials such as a metal or metal alloy. Examples include Au, Ag, Al, Cu, or an alloy thereof.

In some embodiments, the bridging component 3 is configured for lateral optical-signal coupling with the transducer 2 and lateral optical-signal coupling with the transducer 2'. In some embodiments, the term "lateral optical-signal coupling" may refer to optical-signal coupling along a "lateral direction", such as a direction substantially perpendicular to (or normal to) the lateral surface (surface 23) of the transducer 2 or a direction substantially perpendicular to (or normal to) the lateral surface (surface 23') of the transducer 2'. The transducer 2 communicates with the transducer 2' through the bridging component 3. In some embodiments, the transducer 2 optically communicates with the transducer 2' through the bridging component 3 i.e., through the lateral optical-signal coupling between the transducer 2 and the bridging component 3, the transmission of optical signal within the bridging component 3, and the lateral optical-signal coupling between the transducer 2' and the bridging component 3. In some embodiments, the bridging component 3 may be referred to an optical connection element.

In some embodiments, the bridging component 3 is at least partially interposed between the transducer 2 and the transducer 2'. At least a portion of the bridging component 3, such as an interposed portion 33, is interposed between the transducer 2 and the transducer 2'. The transducer 2 communicates (or optically communicates) with the transducer 2' through the interposed portion 33 of the bridging component 3. The lateral surface (surface 23) of the transducer 2 faces the interposed portion 33 of the bridging component 3. The lateral surface (surface 23') of the transducer 2' also faces the interposed portion 33 of the bridging component 3.

In some embodiments, the bridging component 3 includes a surface 34 facing the first transducer 2 and a surface 34' facing the transducer 2'. The surface 34' may be opposite to the surface 34. The surfaces 34 and 34' may be located on the interposed portion 33. The surfaces 34 and 34' may be lateral surfaces. In some embodiments, the surface 23 of the transducer 2 faces the surface 34 of the bridging component 3. The surface 23' of the transducer 2' faces the surface 34' of the bridging component 3. In some embodiments, the bridging component 3 includes a surface 35 facing the carrier 7 and a surface 32 opposite to the surface 35.

The bridging component 3 includes optical regions 30 and 30', which may be optical-signal transmitting and receiving regions. The optical regions 30 and 30' may be configured for transmitting and receiving optical signals. For example, the optical region 30 and 30' may each include an exposed portion of a waveguide or a grating component. The optical regions 30 and 30' are respectively configured for optical-signal coupling with the transducers 2 and 2'. The optical regions 30 and 30' may be disposed or located on the interposed portion 33. In other words, the interposed portion 33 includes the optical regions 30 and 30'. In some embodiments, the optical regions 30 and 30' may be respectively disposed or located on the surface 34 and 34' of the bridging component 3. In some other embodiments, the optical regions 30 and 30' may be disposed or located on the surface 35 of the bridging component 3.

In some embodiments, the bridging component 3 may be disposed partially on or over the transducer 2 and/or the transducer 2'. In some embodiments, the bridging component 3 is at least partially supported by the first transducer 2, the second transducer 2' or both. For example, the bridging component 3 may include a protrusion portion (or an overhang portion, or an arm) 31 disposed over the transducer 2. The protrusion portion 31 may be disposed on and supported by the transducer 2. For example, the protrusion portion 31 may be disposed on and supported by the surface 22 of the transducer 2. The bridging component 3 may include a protrusion portion (or an overhang portion, or an arm) 31' disposed over the transducer 2'. The protrusion portion 31' may be disposed on and supported by the transducer 2'. In some embodiments, the arm 31 is connected to the arm 31'. In some embodiments, the protrusion portion 31 of the bridging component 3 is configured for aligning the optical region 30 of the bridging component 3 with the optical region 20 of the transducer 2, and the protrusion portion 31' is configured for aligning the optical region 30' of the bridging component 3 with the optical region 20' of the transducer 2'. In some embodiments, the optical region 30 on the surface 34 of the bridging component 3 is optically coupled with the optical region 20 on the surface 23 of the transducer 2. The surface 34 of the bridging component 3 is optically coupled with the surface 23 of the transducer 2. The optical region 30' on the surface 34' of the bridging component 3 is optically coupled with the optical region 20' on the surface 23' of the transducer 2'. The surface 34' of the bridging component 3 is optically coupled with the surface 23' of the transducer 2'.

In some embodiments, the bridging component 3 may be configured for internal optical signal communication (i.e., optical signal communication within the electronic device 1, such as between two or more transducers, e.g., transducers 2 and 2'). In some embodiments, the bridging component 3 is configured to provide a short-distance transmission of optical signals for the transducer 2 and/or the transducer 2'. For example, bridging component 3 is configured to provide optical signal transmission between the transducer 2 and the transducer 2'. The bridging component 3 optically connects (or optically couples) the transducers 2 and 2'.

In some embodiments, the bridging component 3 may be a bridge element configured for signal communication. For example, in some embodiments, the bridging component 3 may be configured as an optical bridge element to optically couple two or more transducers. The bridging component 3 may be or include a compact integrated waveguide ensemble (CIWE). In some embodiments, the bridging component 3 may further include a circuit structure and be configured as an electrical bridge element to transmit electric signals. In some embodiments, the bridging component 3 may include active components or passive components as needed while in some embodiments, the bridging component 3 may be only configured for signal communication and includes no additional active/passive components.

In some embodiments, the electronic component 8 and the electronic component 8' are communicated with each other through the bridging component 3. For example, the electronic component 8 may be communicated with the electronic component 8' through the transducer 2, the bridging component 3 and the transducer 2'. In some embodiments, electric signals may be transmitted from the electronic component 8 to the transducer 2, and may be converted to optical signals by the transducer 2. Then, the optical signals may be transmitted through the bridging component 3 to the transducer 2', and may be converted to electric signals by the transducer 2'. Then, the electric signals may be transmitted to the electronic component 8'.

The electronic device 1 may include an optical coupling structure 5 formed or disposed between the transducer 2 and the bridging component 3 and an optical coupling structure 5' formed or disposed between the transducer 2' and the bridging component 3. The bridging component 3 may be optically coupled with the transducer 2 through the optical coupling structure 5 and optically coupled with the transducer 2' through the optical coupling structure 5'. The optical coupling structures 5 and 5' are described in details hereinafter with reference to FIGS. 1C to 1F.

The optical component 4 is optically coupled with the transducer 2. For example, the optical component 4 may be disposed on the transducer 2, such as on the surface 21 of the transducer 2. In some embodiments, optical signals may be transmitted from the optical component 4 to the transducer 2. In some embodiments, the optical signals may be further transmitted through the transducer 2 to the bridging component 3. In some embodiments, the optical signals may be converted by the transducer 2 to electric signals, and the electric signals may be transmitted to the electronic component 8 and further to the processing unit 6 by passing through the electrical connection element(s) 88, the circuit structure 83, the conductive via 86, the circuit structure 84 and the electrical connection element(s) 68. In some embodiments, the processing unit 6 transmits electric signals to the transducer 2 through the electrical component 8, such as through the conductive via 86 of the electrical component 8. Similarly, the optical component 4' may be coupled with and disposed on the transducer 2'.

The optical component 4 may be connected to the transducer 2 through a waveguide (not shown in FIG. 1B). The optical component 4 is configured for external optical signal communication. In some embodiments, the optical component 4 is configured to provide a long-distance transmission of optical signals for the first transducer 2. For example, the optical component 4 may be configured to provide optical signal transmission between the transducer 2 and a component outside of the electronic device 1. Similarly, the optical component 4' is disposed at least partially over the transducer 2'. Specifically, the optical component 4' may have the similar component and/or arrangements as the optical component 4. In some embodiments, the optical components 4 and 4' independently includes an optical fiber array component. In some embodiments, the optical fiber array component includes an integrated component including a plurality of fiber array units (FAUs). In some embodiments, as shown in FIG. 1A, the electronic device 1 may include two or more optical components 4 disposed on the transducer 2, and/or two or more optical components 4' disposed on the transducer 2'.

In some embodiments, the transducer 2 receives electric signals from the electronic component 8, converts the electric signals to optical signals, and transmits the optical signals to the transducer 2' through the bridging component 3. In some embodiments, the transducer 2 receives the electric signals from the electronic component 8, converts the electric signals to the optical signals, and further transmits the optical signals through the optical component 4 to a device outside of the electronic device.

Figure 1C:
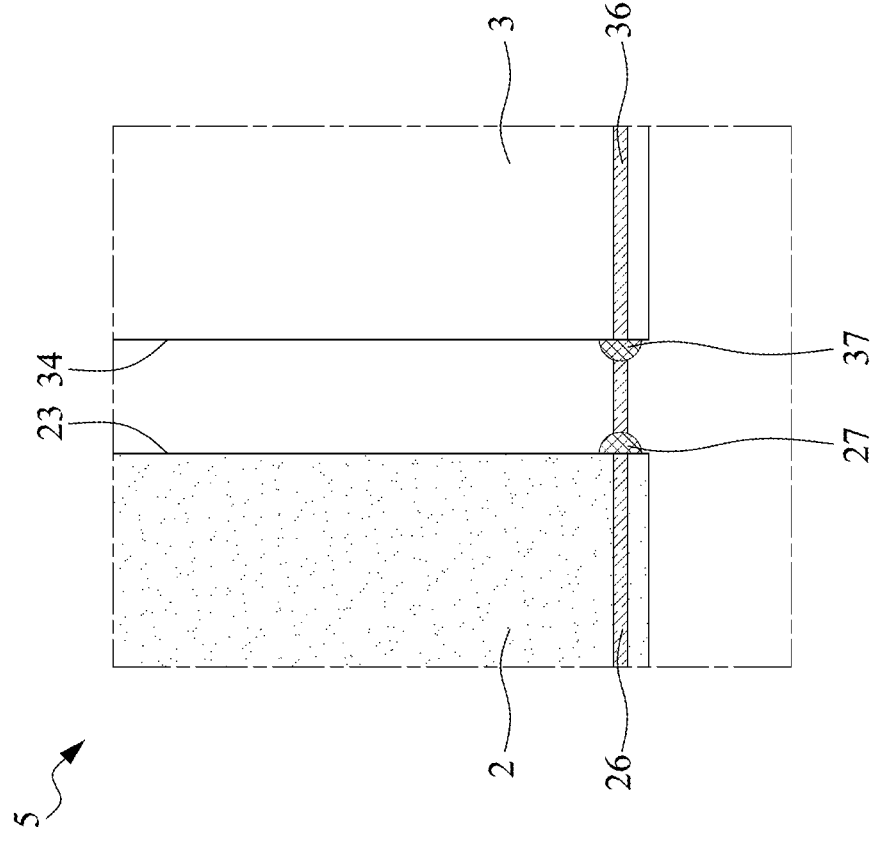
FIG. 1C illustrates a cross-sectional view of a portion of an electronic device according to some embodiments of the present disclosure.

FIG. 1C illustrates a cross-sectional view of a portion of an electronic device according to some embodiments of the present disclosure. In some embodiments, FIG. 1C may illustrate an example of the optical coupling structure 5 of the electronic device 1 illustrated in FIG. 1B. The optical coupling structure 5 optically couples the optical connection element 3 with the transducer 2.

In some embodiments, the transducer 2 may include a waveguide 26, and the waveguide 26 may be exposed from the lateral surface (surface 23) of the transducer 2. In some embodiments, the bridging component 3 may include a waveguide 36, and the waveguide 36 may be exposed from the surface 34 of the bridging component 3 facing the transducer 2. The optical coupling structure 5 is formed or disposed between the transducer 2 and the bridging component 3 and may include one or more optically-transmissive elements disposed between the bridging component 3 and the first transducer 2 as shown in FIG. 1C. In some embodiments, the optical coupling structure 5 may include an optically-transmissive element 27 disposed on or adjacent to a lateral surface 23 of the transducer 2, or an optically-transmissive element 37 disposed on or adjacent to a lateral surface 34 of the bridging component 3, or both. The optical coupling structure 5 (or the optically-transmissive element (s)) may be configured to adjust an optical-signal transmission path between the transducer 2 and the bridging component 3. The optical coupling structure 5 (or the optically-transmissive element(s)) may be configured to transmit optical signals between the transducer 2 and the bridging component 3. In some embodiments, the optically-transmissive element may be or include a lens, for example, a lens 27 disposed on or adjacent to the exposed portion of the waveguide 26, and a lens 37 disposed on or adjacent to the exposed portion of the waveguide 36. The waveguide 26 of the transducer 2 may be coupled with the waveguide 36 of the bridging component 3 through the lenses 27 and 37. The bridging component 3 is optically coupled with the transducer 2 by edge coupling.

In some embodiments, the optically-transmissive element 27 and/or the optically-transmissive element 37 may be omitted. The waveguide 26 of the transducer 2 may be coupled with the waveguide 36 of the bridging component 3 through ambient air therebetween. In some embodiments, the waveguide 26 of the transducer 2 may be disposed sufficiently close to the waveguide 36 of the bridging component 3 so that optical signals can be transmitted through ambient air therebetween.

Figure 1D:
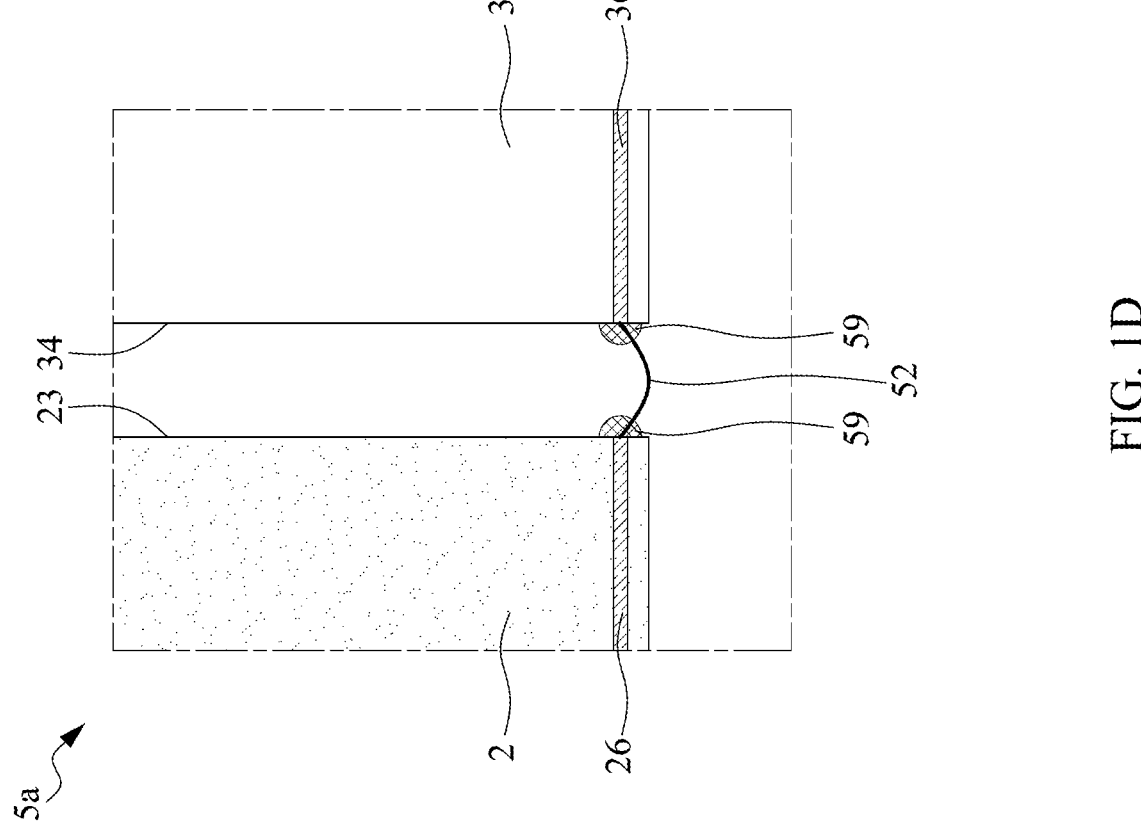
FIG. 1D illustrates a cross-sectional view of a portion of an electronic device according to some embodiments of the present disclosure.

FIG. 1D illustrates a cross-sectional view of a portion of an electronic device according to some embodiments of the present disclosure. Specifically, FIG. 1D may illustrate an example of the optical coupling structure 5a which can be an alternative to the optical coupling structure 5 illustrated in FIG. 1C.

In some embodiments, the transducer 2 may include a waveguide 26, and the waveguide 26 may be exposed from the lateral surface (surface 23) of the transducer 2. In some embodiments, the bridging component 3 may include a waveguide 36, and the waveguide 36 may be exposed from the surface 34 of the bridging component 3 facing the transducer 2. The optical coupling structure 5a is formed or disposed between the transducer 2 and the bridging component 3 and may include an optically-transmissive element 52 disposed between the bridging component 3 and the first transducer 2 as shown in FIG. 1D. The optical coupling structure 5a (or the optically-transmissive element 52) may be configured to adjust an optical-signal transmission path between the transducer 2 and the bridging component 3. The optical coupling structure 5a (or the optically-transmissive element 52) may be configured to transmit optical signals between the transducer 2 and the bridging component 3. In some embodiments, the optically-transmissive element 52 may be or include a photonic wire bond. One end of the photonic wire bond is disposed on the exposed portion of the waveguide 26 of the transducer 2 and the other end of the photonic wire bond is disposed on the exposed portion of the waveguide 36 of the bridging component 3. In some embodiments, the photonic wire bond may be or include an optical fiber. The waveguide 26 of the transducer 2 may be coupled with the waveguide 36 of the bridging component 3 through the photonic wire bond 52. In some embodiments, optical gels 59 may be respectively disposed on the exposed portion of the waveguide 26 of the transducer 2 and on the exposed portion of the waveguide 36 of the bridging component 3 for fixing the photonic wire bond 52. The bridging component 3 is optically coupled with the transducer 2 by edge coupling.

Figure 1E:
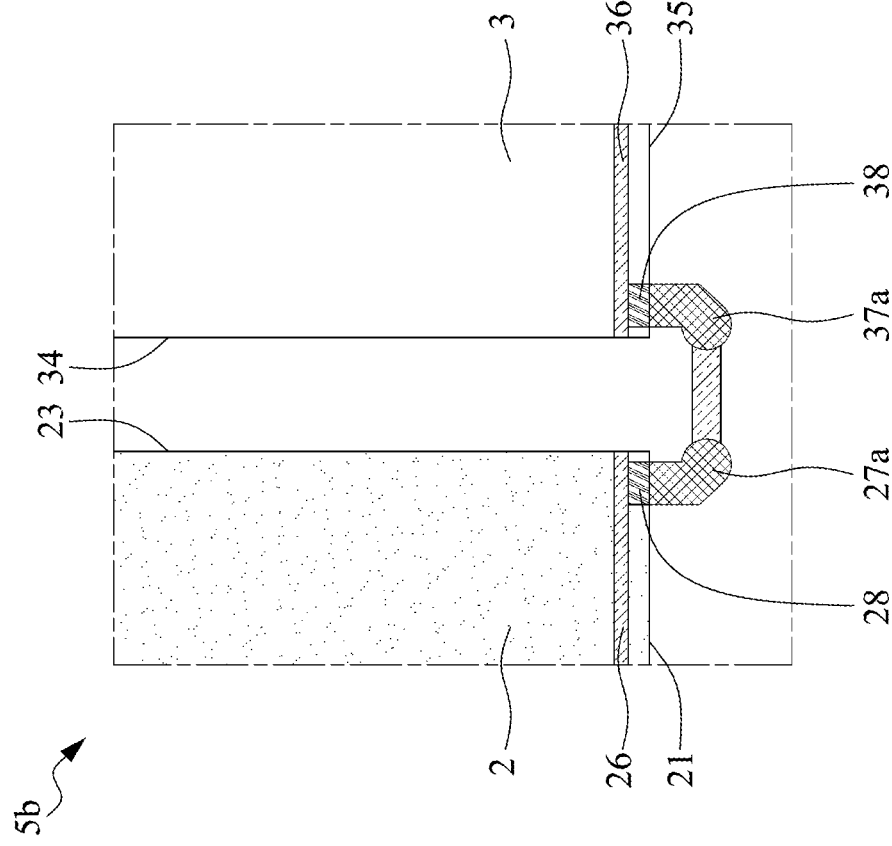
FIG. 1E illustrates a cross-sectional view of a portion of an electronic device according to some embodiments of the present disclosure.

FIG. 1E illustrates a cross-sectional view of a portion of an electronic device according to some embodiments of the present disclosure. Specifically, FIG. 1E may illustrate an example of the optical coupling structure 5b which can be an alternative to the optical coupling structure 5 illustrated in FIG. 1C.

In some embodiments, the transducer 2 may include a waveguide 26 and a grating component 28 connected to the waveguide 26. The grating component 28 is exposed from the surface 21 of the transducer 2. In some embodiments, the bridging component 3 may include a waveguide 36 and a grating component 38 connected to the waveguide 36. The grating component 38 is exposed from the surface 35 of the bridging component 3. The optical coupling structure 5b is formed or disposed between the transducer 2 and the bridging component 3 and may include one or more optically-transmissive element disposed between the bridging component 3 and the first transducer 2 as shown in FIG. 1E. In some embodiments, the optical coupling structure 5b may include an optically-transmissive element 27a disposed on or adjacent to the grating components 28, or an optically-transmissive element 37a disposed on or adjacent to the grating components 38, or both. The optical coupling structure 5b (or the optically-transmissive element(s)) may be configured to adjust an optical-signal transmission path between the transducer 2 and the bridging component 3. The optical coupling structure 5b (or the optically-transmissive element(s)) may be configured to transmit optical signals between the transducer 2 and the bridging component 3. In some embodiments, the optically-transmissive element may be or include a lens, for example, lenses 27a and 37a respectively disposed on or adjacent to the grating components 28 and 38. The waveguide 26 of the transducer 2 may be coupled with the waveguide 36 of the bridging component 3 through the grating components 28 and 38, and the lenses 27a and 37a. The bridging component 3 is optically coupled with the transducer 2 by grating coupling.

In some embodiments, the optically-transmissive element 27a and/or the optically-transmissive element 37a may be omitted. The waveguide 26 of the transducer 2 may be coupled with the waveguide 36 of the bridging component 3 through the grating components 28 and 38, and ambient air therebetween. In some embodiments, the grating component 28 of the transducer 2 may be disposed sufficiently close to the grating component 38 of the bridging component 3 so that optical signals can be transmitted through ambient air therebetween.

Figure 1F:
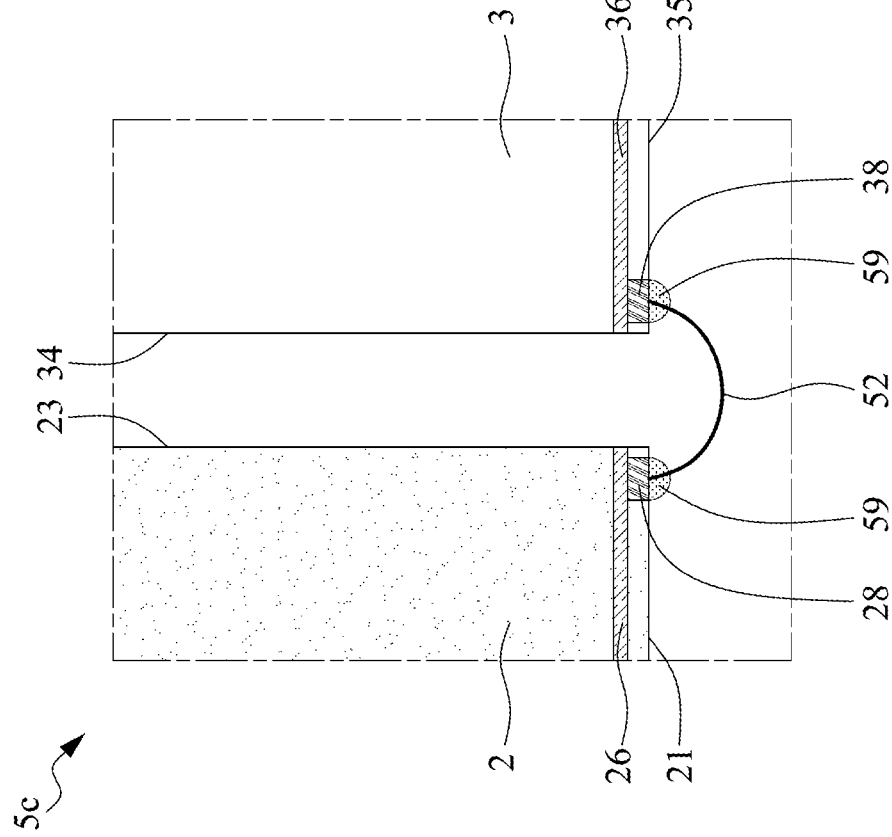
FIG. 1F illustrates a cross-sectional view of a portion of an electronic device according to some embodiments of the present disclosure.

FIG. 1F illustrates a cross-sectional view of a portion of an electronic device according to some embodiments of the present disclosure. Specifically, FIG. 1F may illustrate an example of the optical coupling structure 5c which can be an alternative to the optical coupling structure 5 illustrated in FIG. 1C.

In some embodiments, the transducer 2 may include a waveguide 26 and a grating component 28 connected to the waveguide 26. The grating component 28 is exposed from the surface 21 of the transducer 2. In some embodiments, the bridging component 3 may include a waveguide 36 and a grating component 38 connected to the waveguide 36. The grating component 38 is exposed from the surface 35 of the bridging component 3. The optical coupling structure 5c is formed or disposed between the transducer 2 and the bridging component 3 and may include an optically-transmissive element 52 disposed between the bridging component 3 and the first transducer 2 as shown in FIG. 1F. The optical coupling structure 5c (or the optically-transmissive element 52) may be configured to adjust an optical-signal transmission path between the transducer 2 and the bridging component 3. The optical coupling structure 5c (or the optically-transmissive element 52) may be configured to transmit optical signals between the transducer 2 and the bridging component 3. In some embodiments, the optically-transmissive element 52 may be or include, a photonic wire bond. One end of the photonic wire bond is disposed on or connected to the grating component 28 and the other end of the photonic wire bond is disposed on or connected to the grating component 38. In some embodiments, the photonic wire bond may be or include an optical fiber. The waveguide 26 of the transducer 2 may be coupled with the waveguide 36 of the bridging component 3 through the grating components 28 and 38, and the photonic wire bond 52. The bridging component 3 is optically coupled with the transducer 2 by grating coupling. In some embodiments, optical gels 59 may be disposed on the grating components 28 and 38 for fixing the photonic wire bond 52.

In some embodiments, the coupling structure 5' that optically couples the optical connection element 3 to the transducer 2' may be similar to any one of the coupling structures 5, 5a, 5b and 5c described above and illustrated in FIGS. 1C to 1F.

In the electronic device according to some embodiments of the existing techniques, optical signals are transmitted between optical engines (or photonic components) by passing through the fibers or polymeric waveguides formed on/within a substrate supporting the optical engines (or photonic components). However, the dimension (e.g., diameter or width) of such fibers or polymeric waveguides is larger than that of the waveguides formed on/within the optical engines (or photonic components), and therefore, connections between transmitters (TX) and receivers (RX) of the optical engines (or photonic components) may occupy relatively large areas. As such, the size of the package is undesirably increased. In addition, since the waveguides are pre-formed on the substrate, the flexibility of packaging is relatively low.

In contrast, according to some embodiments of the present disclosure, the bridging component 3 may serve as an optical bridge element that optically couples the optical engines (e.g., the transducers 2 and 2' of the first and second optical engines). The dimension of the waveguides (or light transmission channel) of the bridging component 3 is closer to that of the optical engines (or the transducers 2 and 2') as compared to the fibers or polymeric waveguides, and therefore, the connections between the bridging component 3 and the optical engines may occupy relatively small areas. In addition, the arrangement of the bridging component 3 may vary according to the arrangements of the optical engines (e.g., the transducers 2 and 2' of the first and second optical engines), and therefore the flexibility of packaging is significantly increased.

In the electronic device according to some embodiments of the existing techniques where optical component(s) and transducer(s) are spaced apart from each other and disposed on a photonic interposer for optical signal transmission, since the optical component(s) are configured for external optical signal communication, the optical component(s) are preferably located adjacent to a periphery of the electronic device. Accordingly, the photonic interposer must extend to the periphery of the electronic device to support and optical couple with the optical component, thus the size of the photonic interposer would be large. In addition, the photonic interposer must include I/O terminals with at least two different optical coupling types for optical coupling with the transducer(s) and the optical component(s). This results in a complicated manufacturing process of the bridging component, with low production yield and high manufacturing cost.

In contrast, according to some embodiments of the present disclosure, the bridging component 3 and the optical component 4 are disposed on the transducer 2. Accordingly, the bridging component 3 may have a small size, and only one optical coupling type is required for the I/O terminals of the bridging component 3. The manufacturing cost of the bridging component 3 may be reduced, and the production yield may be improved.

In addition, in some embodiments, these is no processing units disposed between the carrier 7 and the electronic components 8 and 8'. The electronic component 8 and the electronic component 8' may be disposed directly on or over an upper surface of the carrier 7. The electronic device may include one or more process unit(s) disposed side-by-side with the electronic component 8 or 8' or disposed on or under a lower surface of the carrier 7. The electronic component 8 and/or the electronic component 8' may be electrically connected to the processing unit(s) through the carrier 7.

Figure 2:
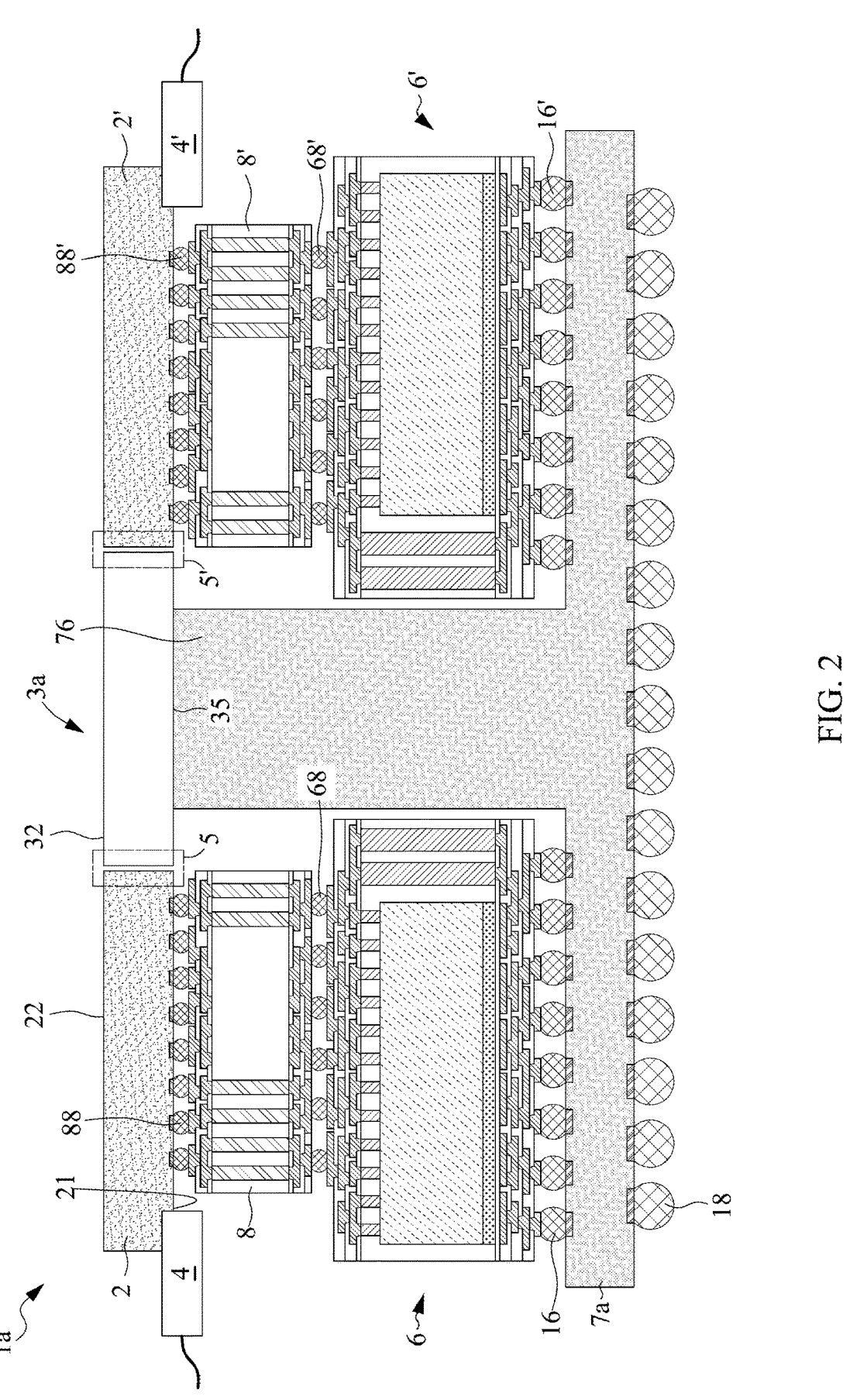
FIG. 2 illustrates a cross-sectional view of an example of an electronic device according to some embodiments of the present disclosure.

FIG. 2 illustrates a cross-sectional view of an example of an electronic device 1a according to some embodiments of the present disclosure. The electronic device 1a is similar to the electronic device 1 shown in FIGS. 1A and 1B, and the difference therebetween is describe as follows.

As shown in FIG. 2, the electronic device 1a may include a carrier 7a, processing units 6 and 6', electronic components 8 and 8', transducers 2 and 2', a bridging component 3a, optical coupling structures 5 and 5', optical components 4 and 4', electrical connection elements 88, 88', 68 and 68', and electrical contacts 16, 16' and 18.

As show in FIG. 2, the processing units 6 and 6' may be disposed over and electrically connected to the carrier 7a, the electronic components 8 and 8' may be disposed over and electrically connected to the processing units 6 and 6', respectively, and the transducers 2 and 2' may be disposed over and electrically connected to the electronic components 8 and 8', respectively; the details and arrangements thereof may be similar to or substantially the same as those in the electronic device 1. The carrier 7a of the electronic device 1a further includes a protrusion portion 76. The protrusion portion 76 may extend from an upper surface of the carrier 7 and be located or interposed between the processing units 6 and 6', and between the transducer 2 and 2'. The bridging component 3a may be disposed on and supported by the protrusion portion 76 of the carrier 7a. Hence, an overhang portion, such as the portion 31 of the bridging portion 3 as shown in FIG. 1B, can be omitted.

The bridging component 3a is configured for lateral optical-signal coupling with the transducer 2 and lateral optical-signal coupling with the transducer 2'. The optical coupling structure 5 and 5' are formed or disposed between the transducer 2 and the bridging component 3a and between the transducer 2' and the bridging component 3a, respectively, may have similar arrangement or configuration as illustrated in FIGS. 1C to 1F. The bridging component 3a may be optically coupled with the transducer 2 or the transducer 2' by edge coupling (e.g., FIGS. 1C and 1D) or grating coupling (e.g., FIGS. 1E and 1F).

In the cases of grating coupling illustrated in FIGS. 1E and 1F, in some other embodiments, the grating component 28 may be connected to the waveguide 26 and exposed from the upper surface 22 (denoted in FIG. 2) of the transducer 2, instead of the lower surface 21 of the transducer 2, and the grating component 38 may be connected to the waveguide 36 and exposed from the upper surface 32 (denoted in FIG. 2) of the bridging component 3a, instead of the lower surface 35 of the bridging component 3a. In such embodiments, the optically-transmissive elements 27a and 37a can be disposed on and connected to the grating components 28 and 38 exposed from the upper surface of the transducer 2 and the upper surface of the bridging component 3a, respectively; and the photonic wire bond 52 can be formed and connected to the grating components 28 and 38 exposed from the upper surface of the transducer 2 and the upper surface of the bridging component 3a, which can simplify the manufacture process thereof.

Figure 3A:
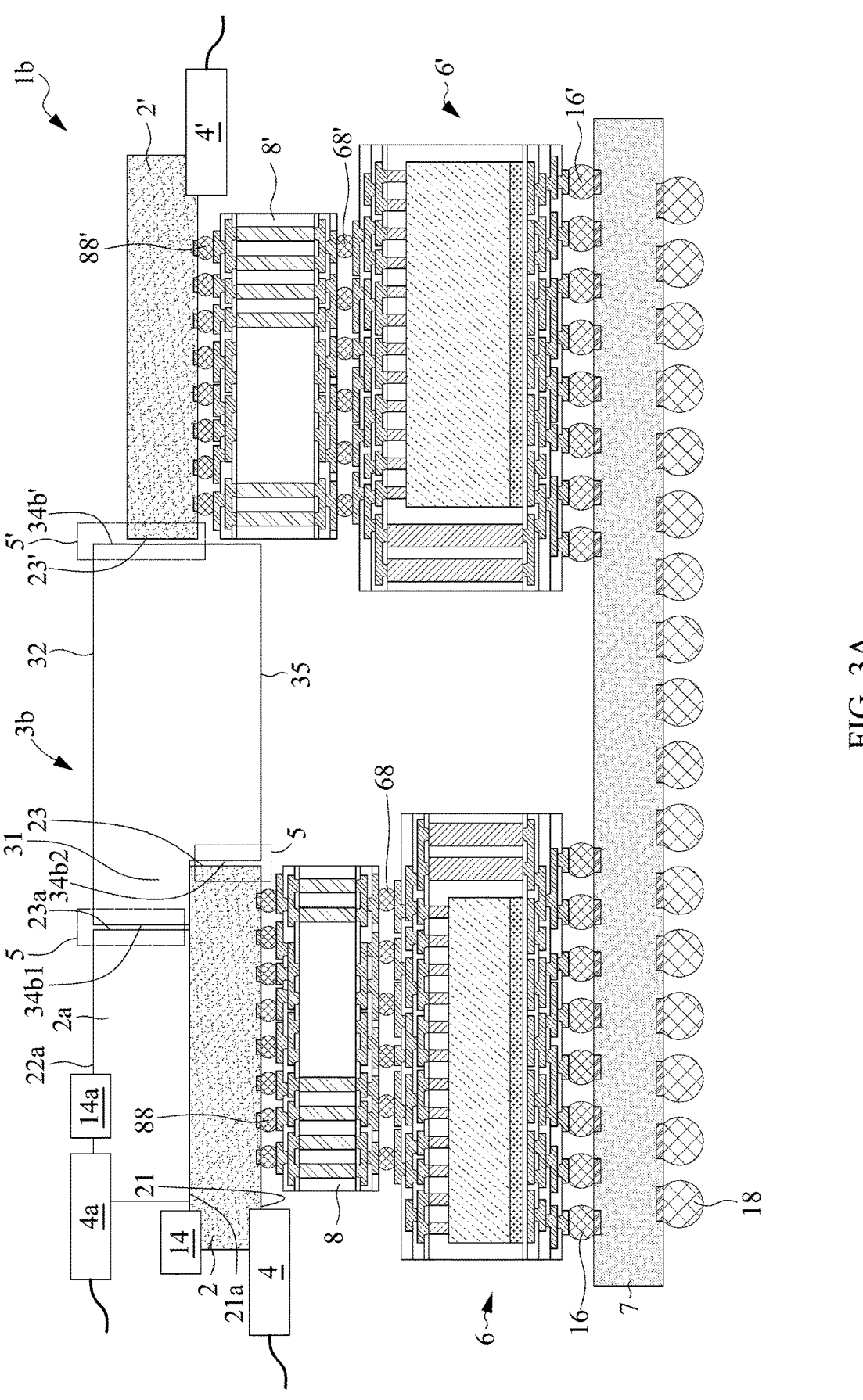
FIG. 3A illustrates a cross-sectional view of an example of an electronic device according to some embodiments of the present disclosure.

FIG. 3A illustrates a cross-sectional view of an example of an electronic device 1b according to some embodiments of the present disclosure. The electronic device 1b is similar to the electronic device 1 shown in FIGS. 1A and 1B, and the difference therebetween is describe as follows.

As shown in FIG. 3A, the electronic device 1b may include a carrier 7, processing units 6 and 6', electronic components 8 and 8', transducers 2 and 2', a bridging component 3b, optical coupling structures 5 and 5', optical components 4 and 4', electrical connection elements 88, 88', 68 and 68', and electrical contacts 16, 16' and 18. In the electronic device 1b, the arrangements and configurations of the carrier 7, the processing units 6 and 6', the electronic components 8 and 8', the transducers 2 and 2', the optical components 4 and 4', the electrical connection elements 88, 88', 68 and 68', and the electrical contacts 16, 16' and 18 may be similar to or substantially the same as those in the electronic device 1. The optical coupling structures 5 and 5' may have arrangements and configurations as discussed above with reference to FIGS. 1C to 1F, 1B and 2.

As shown in FIG. 3A, the electronic device 1b further include a transducer 2a disposed at a level different from the transducer 2. The transducer 2a may be a photonic component. In some embodiments, as shown in FIG. 3A, the transducer 2a may be disposed at least partially on or over the transducer 2. In some embodiments, as show in FIG. 3A, the transducer 2a may be at a level different from the transducer 2'. In some other embodiments, the transducer 2a may be at the same level as the transducer 2'.

The transducer 2a has a surface 21a, a surface 22a opposite to the surface 21a, and a surface 23a extending between the surfaces 21a and 22a. The surface 21a may be an active surface. The surface 21a may faces the carrier 7 and/or the surface 22 of the transducer 2. The surface 23a may be a lateral surface and may faces the bridging component 3b. In some embodiments, the surface 23a of the transducer 2a is not aligned with the lateral surface of the transducer 2.

The electronic device 1b may further include one or more optical components 4a optically coupled with the transducer 2a. For example, the optical component 4a may be disposed on the transducer 2a, such as on the surface 22a of the transducer 2a. In some embodiments, the electronic device 1b may further include one or more laser diodes 14 and 14a respectively optically coupled with the transducer 2 and/or the transducer 2a. The transducer 2a may include one or more optical paths extending between the surface 21a and the surface 22a, such that the optical signals from the optical component 4a and/or the laser diode 14a may be transmitted through the optical paths to the transducer 2. In some embodiments, the transducer 2 may also include one or more optical paths extending between the surface 21 and the surface 22, such that the optical signals from the optical component 4 and/or the laser diode 14 may be transmitted through the optical paths to the transducer 2a.

In some embodiments, the transducer 2 and the transducer 2a may have substantially the same function. In some other embodiments, the transducer 2 and the transducer 2a may have different functions. The transducers 2 and 2a may jointly function as a photonic IC, with circuits that may not result in noises (e.g., digital signal processor) disposed on one of them (e.g., on the transducer 2a), while other circuits are disposed on the other of them (e.g., on the transducer 2). By stacking the transducer 2a on the transducer 2, optical signals can be transmitted therebetween through a shorter path along a vertical direction.

The bridging component 3b is configured for lateral optical-signal coupling with the transducers 2 and 2a and lateral optical-signal coupling with the transducers 2' and 2a. Similar to the bridging component 3 of FIG. 1, the bridging component 3b may include a protrusion portion (or an overhang portion, or an arm) 31 disposed over the transducer 2. The protrusion portion 31 may be disposed on and supported by the transducer 2. In some embodiments, the carrier may include a protrusion portion, such as the protrusion portion 76 illustrated in FIG. 2 to further support the bridging component 3b.

The bridging component 3b may include a surface 35 facing the carrier 7, a surface 32 opposite to the surface 35, and surfaces 34b1, 34b2 and 34b'. The surface 34b' may be opposite to the surfaces 34b1 and 34b2. The surfaces 34b1, 34b2 and 34b' may be lateral surfaces. The surface 34b2 may face the transducer 2 and the surface 34b1 may face the transducer 2a. The surface 34b 1 is not aligned with the surface 34b2. The surface 34b' may face the transducer 2'. The lateral surface 23 of the transducer 2 may face the lateral surface 34b2 of the bridging component 3. The lateral surface 23' of the transducer 2' may face the lateral surface 34b' of the bridging component 3. The lateral surface 23a of the transducer 2a may face the protrusion portion 31 and the lateral surface 34b1 of the bridging component 3. In some embodiments, the surface 34b2 of the bridging component 3b is optically coupled with the surface 23 of the transducer 2. The surface 34b' of the bridging component 3 is optically coupled with the surface 23' of the transducer 2'. The surface 34b1 of the bridging component 3b is optically coupled with the surface 23a of the transducer 2a.

Figure 3B:
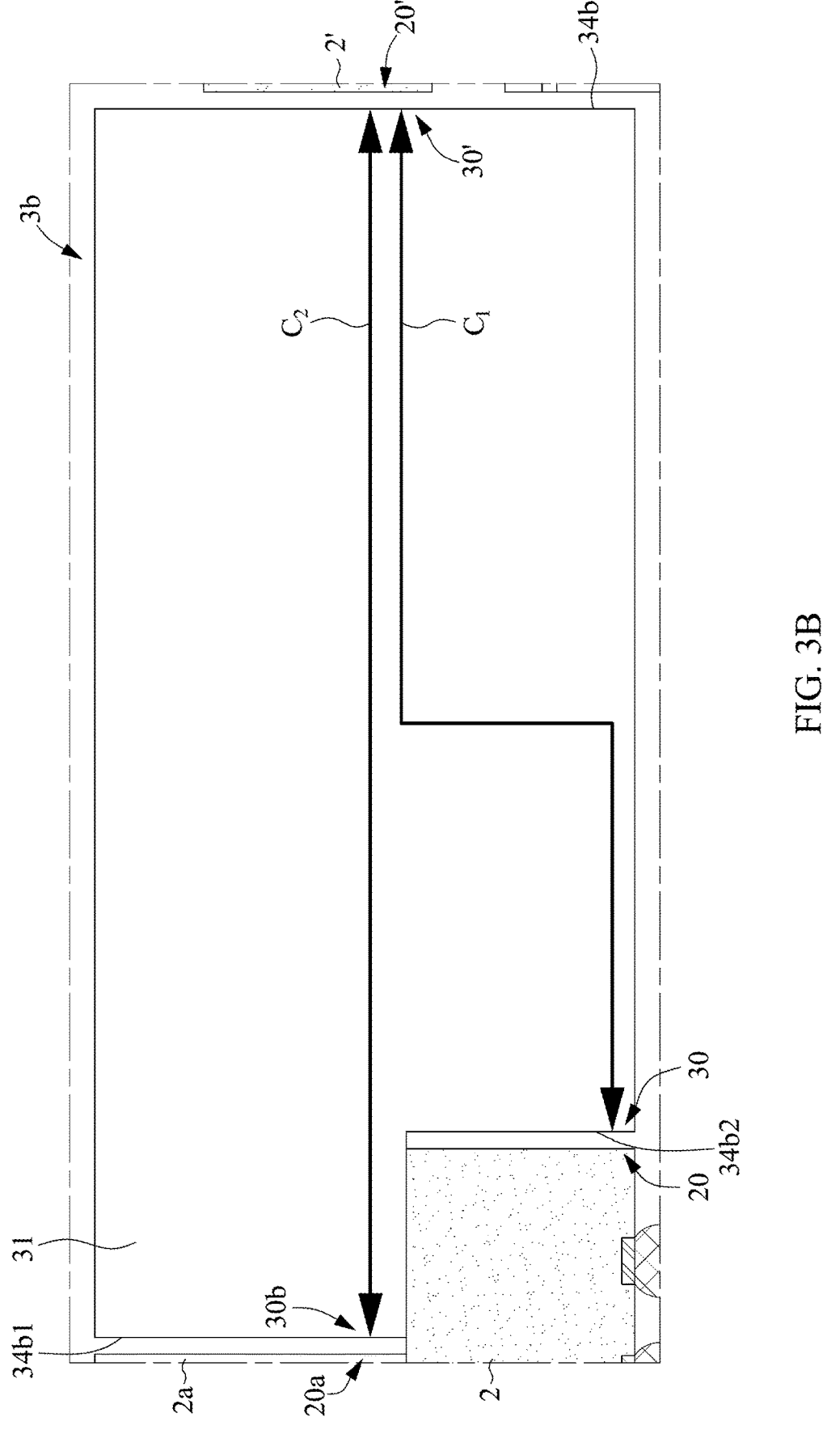
FIG. 3B illustrates a cross-sectional view of a portion of an electronic device according to some embodiments of the present disclosure.

FIG. 3B illustrates a cross-sectional view of a portion of an electronic device according to some embodiments of the present disclosure. For example, FIG. 3B may illustrate an example of a portion of the electronic device 1b including the bridging component 3b.

The bridging component 3b includes one or more optical channels configured to transmit optical signals between the surface 34b1 and the surface 34b' and between the surface 34b2 and the surface 34b'. For example, the bridging component 3b includes an optical channel $C_1$ configured for connecting the transducer 2 and the transducer 2' at two opposite ends of the optical channel $C_1$, and an optical channel $C_2$ configured for connecting the transducer 2' and the transducer 2a at two opposite ends of the optical channel $C_2$. The optical channel $C_2$ passes through the protrusion portion 31 of the bridging component 3b and connects to the transducer 2a. The two opposite ends of the optical channel $C_1$ are at different levels. The two opposite ends of optical channel $C_2$ are at the same level. The optical signal transmitted by the optical channel $C_1$ may be different from the optical signal transmitted by the optical channel $C_2$ (for example, they may have different wavelengths). In other words, with the bridging component 3b, different optical signal(s) can be transmitted in a horizontal direction to other transducer(s) or photonic component(s), without passing through the carrier or substrate and without the conversion between electrical signals and optical signals due to the limitation of transmission medium (e.g., circuit structure or optical medium).

The bridging component 3b includes optical regions 30, 30' and 30b, which may be optical-signal transmitting and receiving regions. The optical regions 30, 30' and 30b, may be configured for transmitting and receiving optical signals. The optical regions 30, 30' and 30b, are respectively configured for optical-signal coupling with the transducers 2, 2' and 2a. For example, the optical region 30 may include the end of the optical channel $C_1$ adjacent to the transducer 2. The optical region 30' may include the other end of the optical channel $C_1$ adjacent to the transducer 2' and/or the end of the optical channel $C_2$ adjacent to the transducer 2'. The optical region 30b may include the other end of the optical channel $C_2$ adjacent to the transducer 2a. In some embodiments, the optical region 30b may be disposed or located at the protrusion portion 31 of the bridging component 3b.

The transducer 2 includes an optical region 20 configured for transmitting and receiving optical signals. The optical region 20 may align with the end of the optical channel $C_1$ of the bridging component 3b adjacent to the transducer 2. The transducer 2' comprises an optical region 20' configured for transmitting and receiving optical signals. The optical region 20' may align with the other end of the optical channel $C_1$ and the end of the optical channel $C_2$ of the bridging component 3b adjacent to the transducer 2'. The optical region 20 of the transducer 2 and the optical region 20' of the transducer 2' are at different levels. The transducer 2a includes an optical region 20a configured for transmitting and receiving optical signals. The optical region 20a may align with the other end of the optical channel $C_2$ of the bridging component 3b adjacent to the transducer 2a. The optical region 20a of the transducer 2a and the optical region 20' of the second transducer 2' are at the same level.

Figure 3C:
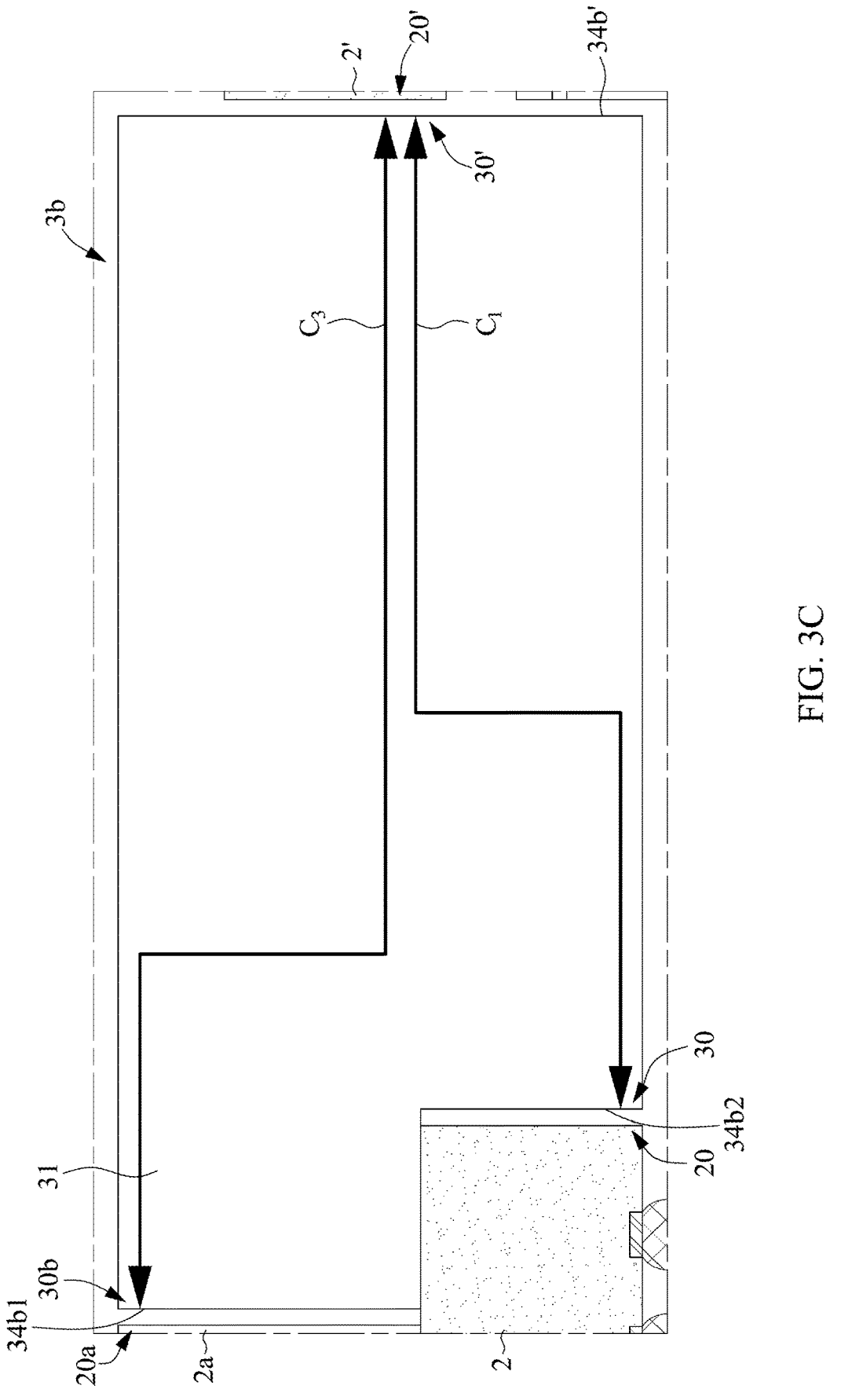
FIG. 3C illustrates a cross-sectional view of a portion of an electronic device according to some embodiments of the present disclosure.

FIG. 3C illustrates a cross-sectional view of a portion of an electronic device according to some embodiments of the present disclosure. For example, FIG. 3C may illustrate another example of a portion of the electronic device 1b including the bridging component 3b.

The bridging component 3b includes one or more optical channels configured to transmit optical signals between the surface 34b1 and the surface 34b' and between the surface 34b2 and the surface 34b'. For example, the bridging component 3b includes an optical channel $C_1$ configured for connecting the transducer 2 and the transducer 2' at two opposite ends of the optical channel $C_1$, and an optical channel $C_3$ configured for connecting the transducer 2' and the transducer 2a at two opposite ends of the optical channel $C_3$. The optical channel $C_3$ passes through the protrusion portion 31 of the bridging component 3b and connects to the transducer 2a. The two opposite ends of the optical channel $C_1$ are at different levels. The two opposite ends of the optical channel $C_3$ are at different levels.

The bridging component 3b includes optical regions 30, 30' and 30b, which may be optical-signal transmitting and receiving regions. The optical regions 30, 30' and 30b, may be configured for transmitting and receiving optical signals. The optical regions 30, 30' and 30b, are respectively configured for optical-signal coupling with the transducers 2, 2' and 2a. For example, the optical region 30 may include the end of the optical channel $C_1$ adjacent to the transducer 2. The optical region 30' may include the other end of the optical channel $C_1$ adjacent to the transducer 2' and/or the end of the optical channel $C_3$ adjacent to the transducer 2'. The optical region 30b may include the other end of the optical channel $C_3$ adjacent to the transducer 2a. In some embodiments, the optical region 30b may be disposed or located at the protrusion portion 31 of the bridging component 3b.

The transducer 2 includes an optical region 20 configured for transmitting and receiving optical signals. The optical region 20 may align with the end of the optical channel $C_1$ of the bridging component 3b adjacent to the transducer 2. The transducer 2' comprises an optical region 20' configured for transmitting and receiving optical signals. The optical region 20' may align with the other end of the optical channel $C_1$ and the end of the optical channel $C_3$ of the bridging component 3b adjacent to the transducer 2'. The optical region 20 of the transducer 2 and the optical region 20' of the transducer 2' are at different levels. The transducer 2a includes an optical region 20a configured for transmitting and receiving optical signals. The optical region 20a may align with the other end of the optical channel $C_3$ of the bridging component 3b adjacent to the transducer 2a. The optical region 20a of the transducer 2a and the optical region 20' of the second transducer 2' are at different levels.

According to some embodiments of the present disclosure, optical signal communication between different levels can be achieved by the bridging component 3b. Transducers having optical regions at different levels can communicated with each other through the bridging component 3b.

Figure 4A:
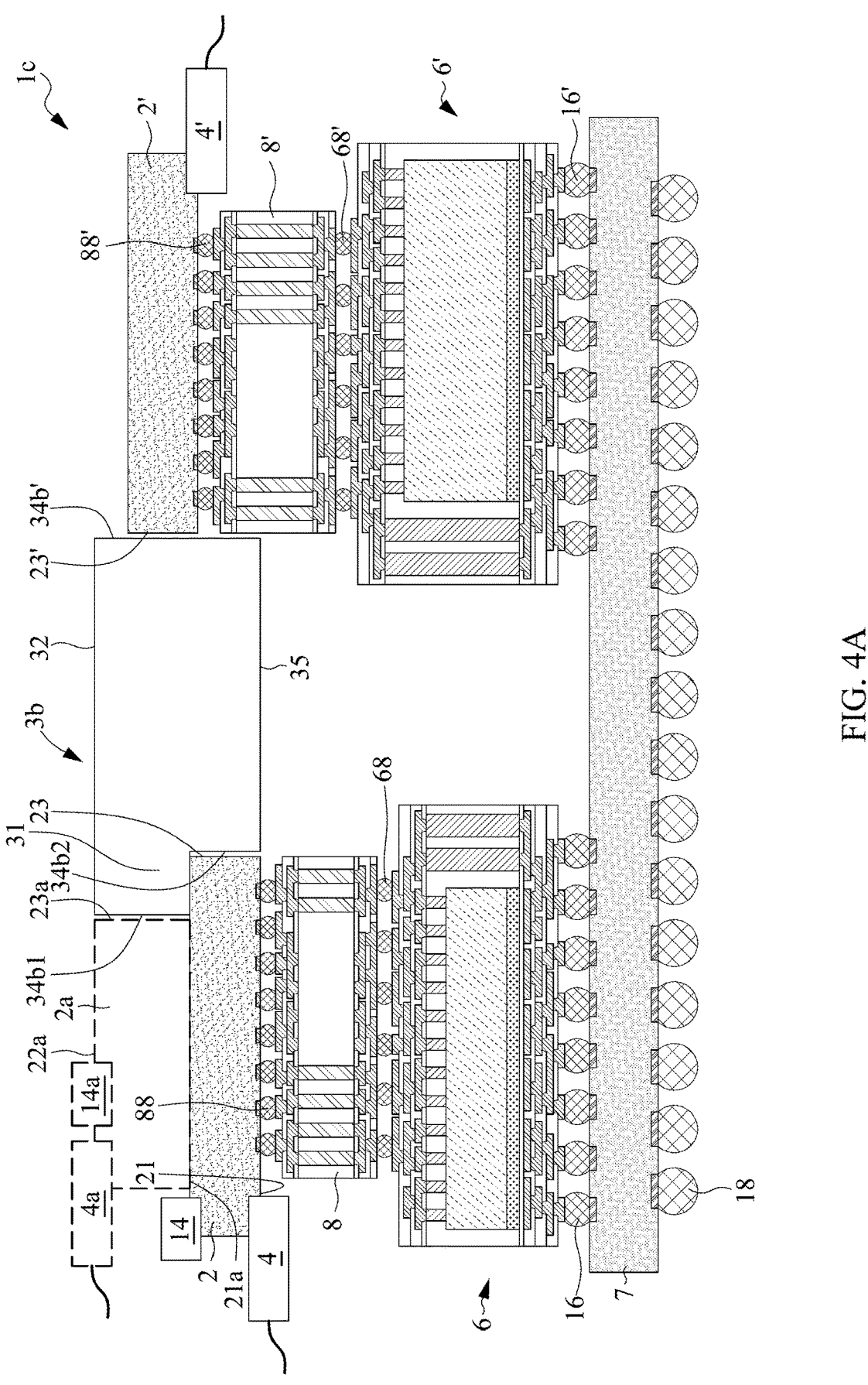
FIG. 4A illustrates a cross-sectional view of an example of an electronic device according to some embodiments of the present disclosure.
Figure 4B:
FIG. 4B illustrates a top view of the electronic device shown in FIG. 4A.

FIG. 4B illustrates a top view of an example of an electronic device 1c according to some embodiments of the present disclosure. FIG. 4A illustrates a cross-sectional view along line B-B' of the electronic device 1c as shown in FIG. 4B. The electronic device 1c is similar to the electronic device 1b shown in FIGS. 3A to 3C, except that the transducer 2a is not disposed on or over the transducer 2. As shown in FIG. 4B, the transducer 2a is spaced apart from the transducer 2. In some embodiments, the transducer 2a may be disposed on another processing unit and/or another electronic component and may be located at a higher level than the transducer 2.

Figure 5:
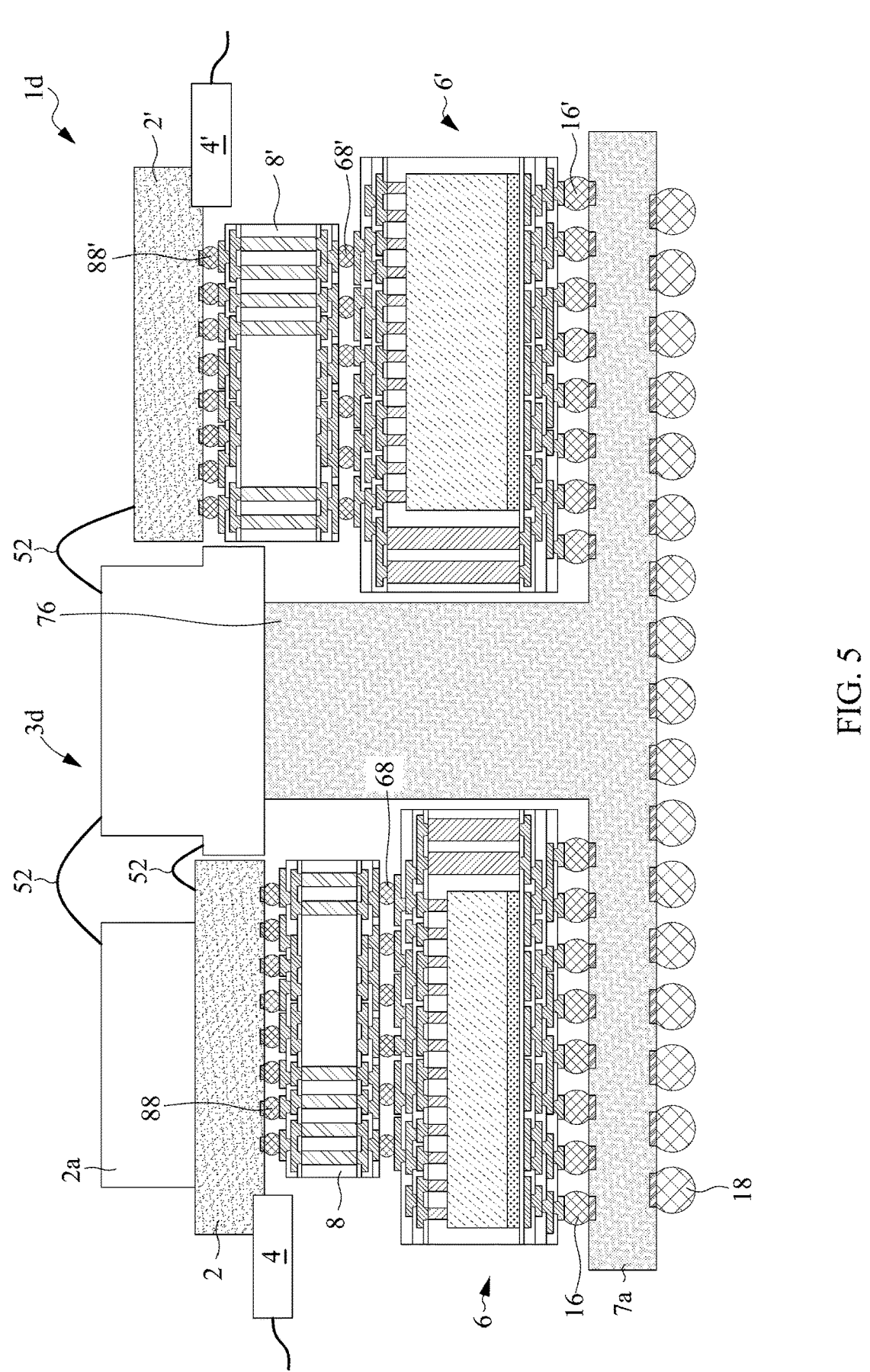
FIG. 5 illustrates a cross-sectional view of an example of an electronic device according to some embodiments of the present disclosure.

FIG. 5 illustrates a cross-sectional view of an example of an electronic device 1d according to some embodiments of the present disclosure. The electronic device 1d is similar to the electronic device 1a of FIG. 2, and the difference therebetween is describe as follows.

As shown in FIG. 5, the electronic device 1d may include a carrier 7a, processing units 6 and 6', electronic components 8 and 8', transducers 2, 2a and 2', a bridging component 3d, optical components 4 and 4', electrical connection elements 88, 88', 68 and 68', and electrical contacts 16, 16' and 18. The arrangements and configurations of the carrier 7a, the processing units 6 and 6', the electronic components 8 and 8', the transducers 2, 2a and 2', the optical components 4 and 4', the electrical connection elements 88, 88', 68 and 68', and the electrical contacts 16, 16' and 18 may be similar to or substantially the same as those in the electronic device 1a.

The bridging component 3d may be disposed on and supported by the protrusion portion 76 of the carrier 7a. The transducer 2a may be disposed at least partially on or over the transducer 2. In some embodiments, the transducer 2 or 2a may optically communicate with the transducer 2' through the bridging component 3d, i.e., through the lateral optical-signal coupling between the transducer 2 or 2a and the bridging component 3d, the transmission of optical signal within the bridging component 3d, and the lateral optical-signal coupling between the transducer 2' and the bridging component 3d. The bridging component 3d may have a stepped structure such that the transducers located at different levels may connected to the different tiers of the bridging component 3*d* by, for example, photonic wire bond(s) 52.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 10+S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. Such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:
a first transducer;
a second transducer spaced apart from the first transducer;
a bridging component configured for lateral optical-signal coupling with the first transducer and the second transducer; and
an optically-transmissive element disposed between the bridging component and the first transducer or between the bridging element and the second transducer and configured to adjust an optical-signal transmission path therebetween.

2. The electronic device of claim 1, wherein the bridging component comprises a protrusion portion disposed over the first transducer and supported by the first transducer.

3. The electronic device of claim 2, wherein the bridging component comprises an optical-signal transmitting and receiving region, and the protrusion portion of the bridging component is configured for aligning the optical-signal transmitting and receiving region of the bridging component 3 with an optical-signal transmitting and receiving region of the first transducer or an optical-signal transmitting and receiving region of the second transducer.

4. The electronic device of claim 1, further comprising a third transducer disposed at a level different from the first transducer, wherein the bridging component is configured for lateral optical-signal coupling with the first transducer, the second transducer and the third transducer.

5. The electronic device of claim 4, wherein the bridging component comprises a first optical channel configured for connecting the first transducer and the second transducer at two opposite ends of the first optical channel, and the two opposite ends of the first optical channel are at different levels.

6. The electronic device of claim 5, wherein the bridging component comprises a second optical channel configured for connecting the second transducer and the third transducer at two opposite ends of the second optical channel, and the two opposite ends of the second optical channel are at different levels.

7. The electronic device of claim 5, wherein the bridging component comprises a second optical channel configured for connecting the second transducer and the third transducer at two opposite ends of the second optical channel, and the two opposite ends of the second optical channel are at the same level.

8. The electronic device of claim 4, wherein the bridging component comprises a protrusion portion from a lateral surface of the bridging component, the protrusion portion is disposed on the first transducer, the bridging component comprises an optical channel passing through the protrusion portion and connecting to the third transducer.

9. The electronic device of claim 1, further comprising a carrier supporting the first transducer and the second transducer, wherein the bridging component is disposed on a protrusion portion of the carrier.

10. The electronic device of claim 1, further comprising:
a first electronic component disposed under the first photonic component; and
a second electronic component disposed under the second photonic component, wherein the first electronic component and the second electronic component are communicated with each other through the bridging component.

11. An electronic device, comprising:
a first photonic component;
a second photonic component spaced apart from the first photonic component;
an optical connection element; and
an electronic component disposed under the first photonic component;
wherein at least a portion of the optical connection element is interposed between the first photonic component and the second photonic component, the first photonic component has a first surface facing the electronic component, a second surface opposite to the first surface, and a lateral surface extending between the first surface and the second surface and facing the interposed portion of the optical connection element, and the first photonic component communicates with the second photonic component through the interposed portion of the optical connection element and comprises an optical region disposed on the lateral surface and configured for optical-signal coupling with the optical connection element.

12. The electronic device of claim 11, wherein the second photonic component has a lateral surface facing the interposed portion of the optical connection element, and comprises an optical region disposed on the lateral surface and configured for optical-signal coupling with the optical connection element.

13. The electronic device of claim 12, wherein the optical region of the first photonic component and the optical region of the second photonic component are at different levels.

14. The electronic device of claim 11, wherein the optical connection element comprises a first arm disposed on and supported by the second surface of the first photonic component.

15. An electronic device, comprising:
a first photonic component;
a second photonic component; and
an optical connection element having a first lateral surface and a second lateral surface opposite to the first lateral surface,
wherein the first lateral surface of the optical connection element faces and is optically coupled with a surface of the first photonic component, and the second lateral surface of the optical connection element faces and is optically coupled with a surface of the second photonic component, and
wherein the surface of the first photonic component and the surface of the second photonic component face each other.

16. The electronic device of claim 15, wherein the optical connection element further comprises a third lateral surface opposite to the second lateral surface and not aligned with the first lateral surface, and the third lateral surface faces and is optically coupled with a surface of the third photonic component disposed over the first photonic component.

* * * * *